United States Patent [19]

Murphy

[11] 4,336,561
[45] Jun. 22, 1982

[54] SUPERCONDUCTING TRANSFORMER

[75] Inventor: John H. Murphy, Wilkins Township, Allegheny County, Pa.

[73] Assignee: Westinghouse Electric Corp., Pittsburgh, Pa.

[21] Appl. No.: 243,325

[22] Filed: Mar. 13, 1981

Related U.S. Application Data

[63] Continuation of Ser. No. 116,328, Jan. 28, 1980.

[51] Int. Cl.³ ............................................. H01F 27/00
[52] U.S. Cl. ...................................... 361/19; 361/141; 336/DIG. 1; 336/231; 335/216
[58] Field of Search .................................. 361/19, 141; 336/DIG. 1, 231

[56] References Cited

U.S. PATENT DOCUMENTS 3,257,587 6/1966 Krafft .................... 336/DIG. 1
4,084,144 4/1978 Weniger ......................... 336/231

FOREIGN PATENT DOCUMENTS

1230579 5/1971 United Kingdom ............... 361/19

Primary Examiner—J. D. Miller
Assistant Examiner—L. C. Schroeder
Attorney, Agent, or Firm—J. P. Hillman

[57] ABSTRACT

A superconducting transformer having a winding arrangement that provides for current limitation when subjected to a current transient as well as more efficient utilization of radial spacing and winding insulation. Structural innovations disclosed include compressed conical shaped winding layers and a resistive matrix to promote rapid switching of current between parallel windings.

11 Claims, 8 Drawing Figures

SUPERCONDUCTING TRANSFORMER

This is a continuation of application Ser. No. 116,328, filed Jan. 28, 1980.

BACKGROUND OF THE INVENTION

1. Field of the Invention

The invention relates in general to superconducting transformers and in particular to current limiting superconducting transformers.

2. Description of the Prior Art

A modern large transformer is a highly efficient device with the resistive losses of the windings being considerably under one half percent of the total power transferred. However, this can represent a significant cost factor over the lifetime of the transformer. Accordingly, there has been increasing emphasis in recent years in replacing the copper windings of a conventional transformer with superconducting windings in order to reduce or eliminate these losses.

Both conventional and superconducting transformers are subject to fault or overload transient currents which can approach ten times the steady state current carried by the transformer. If the windings are designed to carry these currents, potential loss savings using superconducting windings is limited. This is because hysteresis loss in a superconducting wire that is subject to a time varying magnetic field is proportional to its volume. Thus, there would be no advantage to reducing resistive losses of a conventional transformer by replacing the copper windings with superconducting windings that are subject to hysteresis losses.

A significant breakthrough for reducing hysteresis losses in a superconducting transformer is disclosed in copending patent application Ser. No. 036,950, entitled "Superconducting Induction Apparatus", assigned to the same assignee as the present invention. That application discloses eliminating much of the hysteresis losses of a superconducting transformer winding by placing the bulk of the superconducting windings in parallel auxiliary windings and locating these auxiliary windings in field-free regions. Copending application Ser. No. 036,950 also discloses a way of spacing the auxiliary windings relative to the main windings such that they are characterized by a higher impedance than the main windings and consequently negligble current flows in them during steady state operation. The beneficial result of this invention is that the auxiliary windings are not subject to hysteresis losses in the absence of fault or overload conditions because they are substantially nonconducting and located in field-free regions.

Copending application Ser. No. 036,950's design concepts resulted in a superconducting transformer that can carry fault currents of ten times the steady state currents while still achieving low losses under steady state conditions. This design, while a significant improvement over the prior art still required a superconducting winding (whether one winding or divided into main and auxiliary windings) sized ten times that which is necessary to operate under steady state conditions in order to withstand infrequent transient current excursions. Also required, as will be more fully developed infra, is large spaces between windings, necessary both to locate the auxiliary windings in field-free regions and to provide for sufficient insulation to electrically insulate adjacent windings from one another. This last requirement becomes critically important in the higher voltage transformers where a conversion to superconducting windings is economically feasible.

Accordingly, it would be desirable to design a superconducting transformer that would automatically change from a lower input impedance to a higher input impedance when beset by transient and fault currents and thereby inherently limit the magnitude of the fault currents themselves. This would reduce the winding size requirements of the transformer and associated electrical apparatus. It would also be desirable to design an arrangement of primary and secondary main and auxiliary windings so as to minimize the spacing requirements between adjacent windings.

SUMMARY OF THE INVENTION

Briefly, the present invention is a novel superconducting transformer with windings arranged so that the transformer exhibits a lower input impedance under steady state conditions and a higher input impedance under fault or overload conditions. In particular the primary and secondary windings are divided into main and auxiliary stacked layers with the auxiliary layers disposed in two minimum field regions that are known to exist in the superconducting transformer of the invention. The auxiliary windings are arranged to provide a high leakage reactance and thereby limit the transient or overload current flow which is automatically switched or shunted into the auxiliary windings during fault operation.

The superconducting transformer of the invention includes means for open circuiting the main primary and secondary windings when the current exceeds a predetermined magnitude so that the main windings do not present an excessive heat load to the cryogenic fluid or burn themselves out. This also enables a smaller refrigerator to remove the heat generated in the overstressed windings and restore operating temperatures.

The superconducting transformer of the invention employs a unique resistive matrix in the main windings to promote rapid switching of the current from the main to the auxiliary windings when a current transient is experienced. Also employed are novel conical shaped winding layers which provide for closer spacing of the windings and more efficient use of insulation space.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENT

Figure 1:
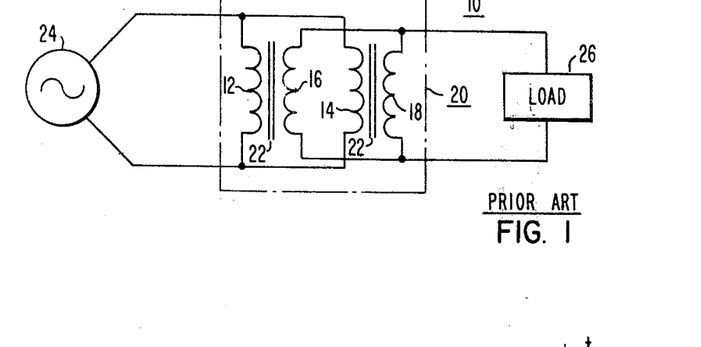
FIG. 1 is a schematic diagram of a superconducting transformer.

Referring now to the drawings, and to FIG. 1 in particular, there is shown a schematic diagram of a superconducting transformer 10 according to the teachings of the invention disclosed in copending application Ser. No. 036,950, which is hereby referred to and incorporated herein. Portions of copending application No. 036,950 that are necessary for the full explanation of the present invention will be repeated in this description of the preferred embodiments. Any inadvertent omission or a more detailed description may be obtained by referring to the full text of that application. Throughout this description, like components will be identified by like numerals. Modified components similar in structure to previously described components will be identified by the previously assigned numerals with the addition of a prime (').

Transformer 10 includes a primary portion including a main primary winding 12 and an auxiliary primary winding 14 and a secondary portion including a main secondary winding 16 and an auxiliary secondary winding 18. The broken outline 20 about the windings represents a tank or housing filled with a cryogenic medium, such as liquid or supercritical helium. The primary and secondary portions, which may be disposed in inductive relation with a magnetic core 22, are shown connected to a source 24 of alternating potential, and a load circuit 26 respectively.

Figure 2:
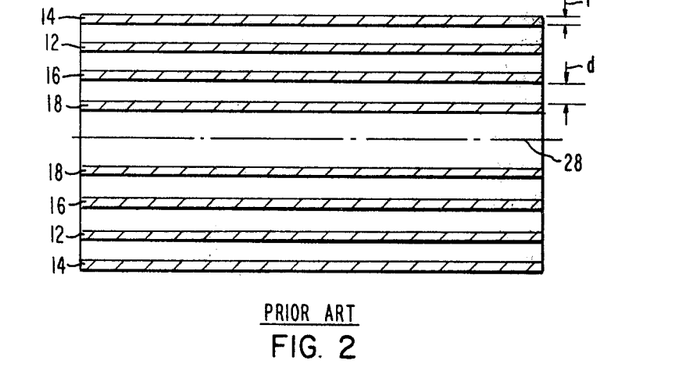
FIG. 2 is a cross-sectional view of the windings of the superconductive transformer disclosed in application Ser. No. 036,950 wherein the primary and secondary windings each have a main winding and an auxiliary winding connected in parallel therewith.

FIG. 2 illustrates a cross-sectional view of the windings of superconductive transformer 10 constructed according to the invention disclosed in copending application No. 036,950 wherein main primary winding 12 is connected in parallel with auxiliary primary winding 14 and main secondary winding 16 is connected in parallel with auxiliary secondary winding 18. Although FIG. 2 denotes the primary winding 12 and 14 disposed outside the secondary windings 16 and 18, this is not essential. As will be shown herein, the windings may be reversed or stacked (i.e. a technique of transformer manufacture wherein a winding is divided into serially connected layers in order to reduce the length of the winding) as desired, as long as the main primary and secondary windings 12 and 16 respectively are placed next to each other and the auxiliary primary and secondary windings, 14 and 18, respectively, are disposed adjacent to the outer and inner peripheries of the main primary and secondary windings in the low-field or relatively field-free regions that can be shown to exist there. The main and auxiliary windings of transformer 10 may be formed by winding superconducting wire on a coil form in a conventional fashion. Such superconducting wire may be multifilamentary, solid superconducting tape or any other superconducting wire known in the art. For enhanced stability the usual superconducting wire employed is of the multifilamentary type embedded in a matrix of copper. The windings 12 through 18 are concentric about center line 28 where a magnetic core may be located. All windings are located in a housing of heat insulating material which is filled with liquid or supercritical helium or any other suitable cryogenic medium.

The design of transformer 10 represents a significant breakthrough for reducing the hysteresis losses of a superconducting transformer. A large portion of the hysteresis losses in the superconducting windings (12 through 18) is eliminated by placing the bulk of the superconducting windings in auxiliary windings connected in parallel with the main windings and locating the auxiliary windings in low or field-free regions where the windings will not be subject to hysteresis losses in the absence of current flow. During steady state operation of transformer 10, current is reduced to a minimum in the auxiliary windings by locating them relative to the main windings such that they exhibit a higher impedance than that of the main winding. Negligible current then flows in the auxiliary windings until a predetermined current is exceeded in the main windings at which time the impedance of the main windings increases to cause the auxiliary windings to carry the excess current.

The two things necessary for this reduction in hysteresis losses are (1) negligible current flow in the auxiliary windings under steady state conditions and (2) the location of such auxiliary windings in relatively field-free regions. In general, the primary and secondary windings of a transformer such as transformer 10 produce equal and opposite magnetic fields. By locating the windings of a transformer, such as the main primary and secondary windings 12 and 16 respectively of transformer 10, concentric and radially adjacent with as small a gap separating the windings as possible, the magnetic fields of the individual windings cancel each other out and two relatively field-free regions are created, one on the inside of the inner winding and one on the outside of the outer winding. There is a magnetic field present between the main primary and secondary windings 12 and 16 respectively of approximately $H = 0.4\ NI/l$ oersteds (I in amperes, l in centimeters). The auxiliary windings 14 and 18 are distributed evenly along the inner and outer periphery of the main windings 12 and 16. A radial spacing d which is typically about ten times the winding thickness t is necessary so that the thickness of the windings may be neglected and the auxiliary windings may be determined to be in relatively field-free regions. The current which flows in these windings when they are connected in parallel and wound in the same winding sense may be determined as follows.

In FIG. 2, consider the two resistance-less outer concentric windings (12 and 14) to have the same length and number of turns. If the two coils are connected in parallel and excited with AC, the voltage induced in each coil must be the same, and consequently the average flux density in the region between the inner and outer coil must vanish since this flux is linked only by the outer coil. Let the thickness of the winding be neglected. The flux between the windings contains a part $K_{22}I_2$, proportional to the current $I_2$ in the outer coil 14, and a part $K_{21}I_1$ proportional to the current $I_1$ in the inner coil 12. In general, $K_{21}$ is smaller than $K_{22}$. If, in addition, an average flux $\phi_o$, coming from external sources, exists in the space between the windings, then:

$$K_{22}I_2 + K_{21}I_1 + \phi_o = 0$$

If $\phi_o = 0$, as it will be if there is no source of field other than the coils 12 and 14, it follows immediately than the ratio $I_2/I_1$ is given by $-K_{21}/K_{22}$. For a long coil (length greater than about three times the diameter), the magnitude of this ratio can be shown to be less than 1/10. Consequently, the current flows essentially in the inner coil.

Now consider the two resistance-less inner concentric windings 16 and 18 of FIG. 2 to have the same length and number of turns. At first glance, it would seem the inner windings 16 and 18 would experience the same curent sharing as the outer windings 12 and 14, but this does not occur. The opposite current sharing of the inner windings 16 and 18 can be understood from the following considerations. The net flux in the space between (i.e. linking) the inner main winding 16 and its auxiliary winding 18 connected in parallel must be zero. (If it were not zero, a voltage would be induced in the electrical loop formed by the two windings connected in parallel and tend to produce infinite current since the loop is a superconducting short circuit.) For ideal solenoids, this will be the case if all the current flows in the main winding 16. The field inside the inner periphery of the main winding 16 will then be zero, because the field of winding 12 is now cancelled out by the field of winding 18. For non-ideal windings and stray fields, a small aount of current must circulate in the lower main winding 16 and its auxiliary 18 in a sense which causes the net flux linking the said two windings to be zero. This circulating current will be small compared with the net current flowing in the main winding 16 insofar as the stray field is small compared with the field between main primary and secondary windings 12 and 16, indicating that the current flows mainly in the outer winding 16 of the two parallel windings 16 and 18.

We see that the bulk of the windings then may be located in the auxiliary windings which operate in field-free regions where they would not be subject to hysteresis losses, in the absence of current flow. The main windings are sized approximately one tenth that of the auxiliary windings and still have the capacity to carry normal operational currents. Normal operational current flows in the main windings due to their lower impedances because of the winding arrangement.

Figure 3:
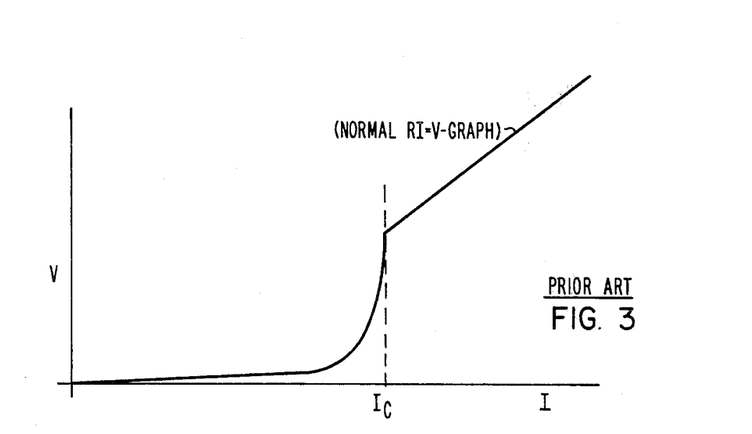
FIG. 3 is a graph illustrating voltage or electric field variation with the current density in a superconducting wire.

FIG. 3 is a graph which will aid in the understanding of the current sharing between the main and the auxiliary windings. FIG. 3 shows the relationship between resistive voltage, that is IR voltage and current I for a superconducting wire. The voltage remains very close to zero, so close, in fact, that we can ignore it until the current in the superconducting wire approaches the critical value, $I_c$ wherein the resistivity begins to appreciate. It is here that the current would begin to diverge from the main windings 12 and 16 into the auxiliary windings 14 and 18 as the auxiliary windings still have a resistivity near zero. Although the reactive impedance of the auxiliary windings is appreciably greater than the reactive impedance of the main windings, the current will begin to diverge because now the appreciated resistivity of the main windings presents a greater impedance than the reactive impedance of the auxiliary windings.

The invention disclosed in application Ser. No. 036,950 then resulted in a superconducting transformer that can carry fault currents of ten times the steady state current while still achieving low losses under steady state conditions. This invention while a significant improvement over the prior art still required superconducting windings (whether one large integral winding or dividing the winding into main and auxiliary portions) sized ten times that which is necessary to operate under steady state conditions in order to withstand transient current excursions. Another consequence of the design disclosed in patent application Ser. No. 036,950 is apparent upon consideration of the voluminous spacing between winding layers necessary for a stacked winding transformer. In order to recover the additional initial cost of the refrigerator a superconducting transformer would only be a practical replacement for a conventional transformer for the large power transformers such as is used for connecting a power generator with a utility system or such as is used to interconnect the transmission grids of neighboring utility systems. These applications demand a transformer with an extremely high KVA rating and, of particular interest here, a high voltage rating, typical would be 340 KV or greater. In the conventional transformer these higher voltages are accomodated by a technique of building the windings in layers and stacking the primary and secondary winding layers as closely together as possible to provide for maximum coupling of their fields and maximum power transfer while reducing the length of the high voltage winding to a practical size for manufacturing.

Combining the techniques of conventional layered winding practice and the concepts of copending application Ser. No. 036,950 would result in superconducting transformer 10 having a winding configuration 30 shown schematically and in cross section in FIG. 4. The main secondary winding is now divided into four serially connected nearly equal voltage sharing main secondary layers 32, 34, 36 and 38. Each main secondary layer 32 through 38 has an associated auxiliary secondary layer 42, 44, 46 and 48 connected electrically in parallel respectively to form stacked secondary winding 50. In order to produce field-free regions for the auxiliary windings as taught by copending Application No. 036,950, the primary winding must also be layered and stacked adjacent to each secondary layer. Accordingly, winding configuration 30 shows the main primary winding divided into four serially connnected equal voltage sharing main primary layers 62, 64, 66 and 68 with each main primary layer having an associated auxiliary primary layer 72, 74, 76 and 78 connected electrically in parallel respectively to form stacked primary winding 80. Windings 32 through 78 are all symmetrical about longitudinal axis 40 with only the top half shown in FIG. 4. Stacked primary winding 80 terminates in low voltage terminals 92 and 94 which may be connected to an external source of low voltage alternating potential such as a generator or terminals of a transmission grid. In the same manner secondary winding 50 terminates in high voltage terminals 96 and 98 which may be connected to a higher voltage load circuit or transmission grid.

Figure 4:
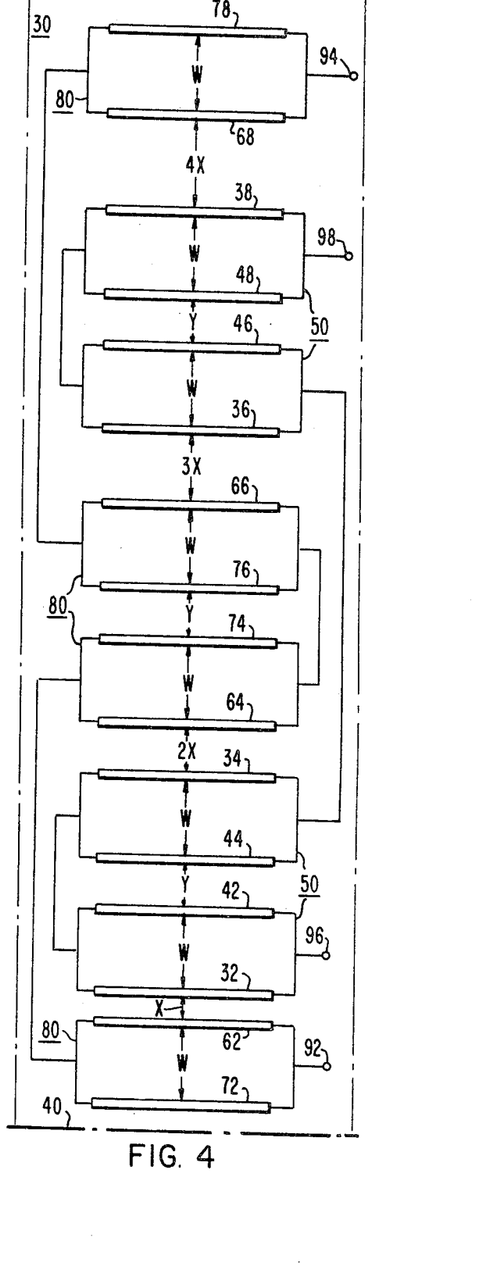
FIG. 4 is a cross-sectional view and a schematic diagram of the windings of a superconducting transformer having stacked layers constructed according to conventional layered winding practice.

FIG. 4 graphically displays the large radial spacing requirements of superconducting transformer windings designed in accordance with the teachings of copending application Ser. No. 036,950 (in order to reduce the hysteresis losses of the superconducting windings) and conventional layered winding practice (required of transformers employed in the high voltage environment of the power and transmission industries). First of all, in order to minimize hysteresis losses in the auxiliary windings, the layered windings must be stacked such that eight field-free regions are generated. Each of these regions or spaces is denoted by the letter W in FIG. 4. In order to take full advantage of the field-free regions, each of the auxiliary windings should be located a distance d equal to ten times the winding thickness away from the main windings as shown in FIG. 2. Eight individual d distances then would be required. Radial spacing or regions required by voltage considerations include the spacing required between adjacent layers of the same winding, as well as the radial spacing required by adjacent layers of primary and secondary windings. Insulation spaced between adjacent layers of the same winding is necessary because the serially connected individual layers are at different voltage potentials. Each of these regions is denoted by the letter Y in FIG. 4, three such Y regions or spaces being required. Since the secondary winding is characterized by an arithmetic progression of voltage while the main winding layers are basically at the same lower voltage potential, adjacent primary and secondary winding layers are characterized by an arithmetic progression of potential difference. The insulation necessary between such adjacent layers is located in regions that are characterized by an arithmetic progression of necessary spacing thickness. Such regions in FIG. 4 are denoted X, 2X, 3X, and 4X, X being the spacing required between the two adjacent primary and secondary layers with the lowest potential difference and 4X denoting the spacing requirement between the two adjacent primary and secondary winding layers with the highest potential difference.

Winding configuration 30 shown in FIG. 4 then combines the teachings of copending application Ser. No. 036,950 and conventional stacked layered windings to produce a superconducting transformer which is characterized by low hysteresis losses, since the bulk of the windings are placed in auxiliary windings and located in field-free regions. The disadvantages of this transformer design is of course the fact that the windings must still be sized ten times larger than that necessary to operate under steady state conditions (whether located in main or auxiliary windings) and further, the necessary spacing requirements result in a transformer having a large physical size. The physical size of this design of transformer in fact may equal or exceed the physical size of a conventional transformer of the same ratings notwithstanding the fact that the physical size of superconducting wire is but a small fraction of its conventional copper counterpart. The reduction in hysteresis losses of the superconducting windings of FIG. 4 is offset by substantial magnetic core losses, since the magnetic core must be long enough to circumscribe the bulk of the physical windings.

Considerable emphasis therefore was directed to design of superconducting transformer windings that would limit fault or overload currents rather than incorporate built in winding bulk as a safety factor to withstand such excessive currents as the winding arrangement of FIG. 4 did. This effort culminated in the winding design shown in cross-section and schematically in FIG. 5. Superconducting transformer winding design 100 includes non-layered main primary winding 102 and non-layered auxiliary primary winding 104. Auxiliary primary winding 104 is connected in parallel with and disposed along the periphery of main primary winding 102 forming primary winding 106. Primary winding 106 terminates in low voltage terminals 107 and 109 which may be connected to a source of alternating potential such as a power generator or transmission grid. Main primary winding 102 and auxiliary primary winding 104, since they are subject to a relatively low voltage, are not required to be divided into layers. The main and auxiliary secondary windings, however, must be divided into layers in order to accommodate the length and insulation spacing requirements that are necessary for the higher potentials which the secondary windings are subject to. Accordingly, main secondary winding 110 is divided into four serially connected nearly equal voltage sharing layers 112, 114, 116 and 118 respectively, which layers are disposed radially adjacent to one another thereby being grouped together. Auxiliary secondary winding 120 includes four serially connected nearly equal voltage sharing layers 122, 124, 126 and 128 respectively, which layers rather than being disposed adjacent to their corresponding main secondary layers are disposed radially adjacent to one another thereby being grouped together also. The entire auxiliary secondary winding 120 now being connected in parallel as a whole with the entire main secondary winding 110 to form secondary winding 130. All windings and winding layers are disposed concentric about center line 150 where a magnetic core may be located. Secondary winding 130 terminates in high voltage terminals 132 and 134 respectively which may be connected to a high voltage load circuit or transmission grid.

Figure 5:
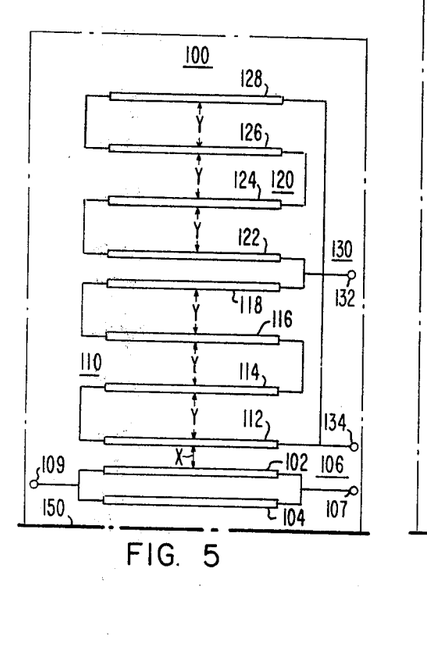
FIG. 5 is a schematic diagram and a cross-sectional view of the windings of a superconducting transformer having stacked layers constructed according to the teachings of the invention.

FIG. 5 highlights the space reductions possible for a superconducting transformer designed according to the teachings of the invention. The unique arrangement of the secondary winding layers wherein the main and auxiliary winding layers are grouped together rather than intermingled results in a transformer with no field-free regions, as compared to the eight field-free regions that are created by winding arrangement 30, with conventional design criteria. Since there are no field-free regions there are no required adjacent winding spaces of a distance equal to ten times the winding layer thickness.

An additional savings of necessary insulation space derives from the fact that since the primary windings are not interlayed with the main and auxiliary secondary, the main and auxiliary secondary layers only have to be radially spaced apart to accommodate the equal voltage potentials between them, denoted again by the letter Y. This space savings is a direct result of the compactness of winding design 100. Although the flux density increases within the windings (which factor determines the voltage rating of the transformer), the turn to turn voltage difference (which factor determines the insulation requirements) remains the same. There is no requirement for an arithmetic progression of necessary insulation spacing as denoted in FIG. 4 by a multiple of X insulation space, i.e. 2X, 3X, 4X, etc. Of course, there must be one space X located between the main primary winding 102 and the first layer 112 of the main secondary winding and is labeled accordingly in FIG. 5. Most importantly, however, is that now there are no secondary layers of arithmetically increasing voltage potential that must be separated from a main primary low potential winding. The two non-labeled spaces of winding design 100 shown in FIG. 5 represents spaces with no special W, X, or Y dimension requirement. All that is necessary is space for the normal insulation and physical location of the winding.

Although the main secondary winding layers and all but one of the auxiliary secondary winding layers are now subject to hysteresis losses because they are operating in the field generated by the adjacent layer (i.e. there are no field-free regions v.s. the eight field-free regions of the conventional design of FIG. 4) this loss is more than compensated for by the reduction in magnetic core losses due to the reduction in magnetic core size i.e. the circumference of magnetic core necessary to encircle the windings. Comparison studies of the two winding designs of FIGS. 4 and 5 have shown them to have about equal losses.

Of greater importance than the size reduction facilitated by the teachings of the invention is the current limiting characteristics of superconducting transformer winding design 100. Referring now to FIG. 5, all of the windings 102 through 128 of winding arrangement 100 being formed of superconducting wire are essentially resistanceless. However the windings are characterized by different impedances because of different reactances that each exhibit. The reactance of main primary and secondary windings, 102 and 110 respectively, being coupled closely together shall be termed linkage reactance and is very low. However, auxiliary primary and secondary windings, 104 and 120 respectively, are not coupled closely and therefore are characterized by a substantial leakage flux and exhibit what shall be termed leakage reactance are characterized by a substantial leakage flux and exhibit what shall be a much higher substantial impedance value. This is so because windings that exhibit leakage reactance are for all intensive purposes similar to a free-standing inductor or choke. The magnetic flux generated by these auxiliary windings is not linked or coupled to an equal and opposite magnetic flux as in the main windings and so induces an electromotive force within the winding that tends to oppose the magnetic field generated, similar to the induced voltage in a free standing inductor. This is the reason the auxiliary windings exhibit a much greater impedance than the main windings in a parallel winding arrangement such as winding arrangement 100.

Referring again to FIG. 5, main primary and main secondary windings 110 and 120, respectively are located relatively close together and the magnetic fields of each couple and cancel each other. For this reason two minimum field regions are created on their peripheries. These windings would be characterized by linking fields or linkage reactance although there is a small amount of leakage reactance due to the radial spacing of the main secondary winding layers. For our purposes this small amount of leakage may be neglected. Under steady state conditions the main primary and secondary superconducting windings will substantially conduct the total current flow due to their reduced reactive and resistive impedance. However, upon assault by a fault or overload current their resistance increases dramatically (refer to the explanation relative to FIG. 3) and the current flow would divert from the main primary and secondary windings into the auxiliary primary and secondary windings which still exhibit low resistance since their current flow remains below the critical value of FIG. 3. When this occurs it can be seen that the overload or transient currents now flowing in the auxiliary windings are separated by a relatively large space and their magnetic fields would be characterized by having a large portion being non-linked and non-cancelled thereby exhibiting a leakage reactance which as explained earlier tends to make the transformer look to the outside world as a pure inductor-thereby limiting the current flow therethrough.

Figure 6:
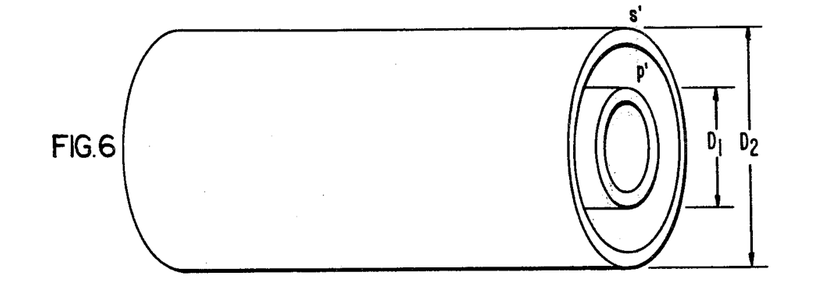
FIG. 6 is a cross-sectional view of a model of the auxiliary secondary windings of FIG. 5.

FIG. 6 will help to further explain this phenomenon. When a superconducting transformer has a current limiting winding arrangement 100 according to the teachings of the invention and carries a current flow above a predetermined magnitude the current switches out of the main windings as hereinbefore explained, and into the auxiliary windings which may be represented by P' and S' in FIG. 6. If these P' and S' windings were infinitely long cylindrical solenoids, then under transient, fault or overload conditions the leakage flux in the gap between the P' and S' windings would be given by the field produced by the S' winding times the cross-sectional area of the gap, i.e.

$$\phi_l = (\mu_o n I) \frac{\pi(D_2^2 - D_1^2)}{4},$$

where
$\mu_o = 4\pi \times 10^{-7}$ H/m
n = turns per unit length in the S' winding
I = current in the S' winding
$D_2$ = diameter of the S' winding
$D_1$ = diameter of the P' winding.

We see that for $D_2 >> D_1$ (which is the case in current limiting winding arrangement 100) the leakage flux and hence the leakage reactance is directly dependent upon the separation of the P' and S' windings. Since the fault current in a winding is inversely proportional to the leakage reactance, the fault current can be decreased by increasing the separation between the P' and S' windings. A three to one (3:1) reduction in fault current flow has been demonstrated on an experimental prototype of the preferred embodiment of the invention. Referring now to FIGS. 4 and 5, it is apparent that the principal objective and result of the winding arrangement of FIG. 5 (according to the teachings of the invention) is to increase the separation between the auxiliary windings, (P' and S' of FIG. 6) so that a superconducting transformer of this design becomes current limiting under fault and overload conditions. The transformer would also have a reduced size due to the reduction in winding radial displacement. Hence, one can design the main primary and secondary windings to carry only the steady state current while the auxiliary primary and secondary windings carry the fault currents and then only a portion of the fault currents since the auxiliary primary and secondary winding arrangement presents a higher input impedance than the main primary and secondary windings.

Limiting fault and overload currents in a superconducting transformer limits the amount of force acting upon the transformer windings and simplifies the mechanical design of the supports for the windings. Moreover, the current limiting effect of the auxiliary windings enables a reduction in the size of the auxiliary windings themselves so that the windings do not have to be designed large enough to withstand the full magnitude of expected fault and transient currents but may be designed to handle only that portion of the expected fault currents that would flow through the higher change in impedance.

Figure 7:
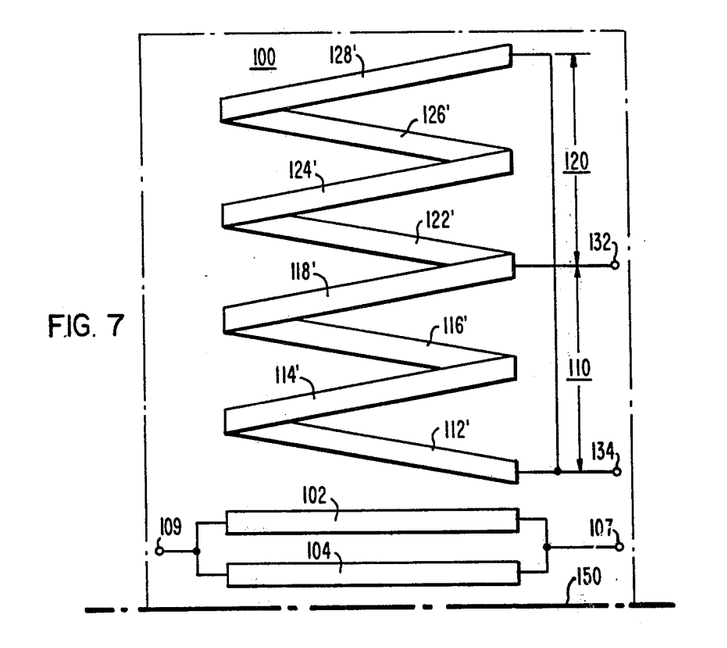
FIG. 7 is a schematic diagram and a cross-sectional view of the windings of a superconducting transformer stacked in concial configured layers according to the teachings of the invention.

A unique innovation in winding structure and insulation was developed for this winding arrangement wherein the layers are stacked in adjacent groups. FIG. 7 shows a cross-sectional view of winding configuration 100 utilizing the new insulation techniques. The main and auxiliary primary windings 102 and 104 being non-layered are shown in conventional fashion disposed directly above center line 150 at an insulation distance from a magnetic core and from each other commensurate with the voltage expected in normal operation. The secondary layers 112 through 128 being serially connected and disposed adjacent to one another can be wound in a conical shape and connected to each other at their common sections. Accordingly, main secondary winding layers 112', 114', 116', and 118' are disposed in accordion fashion in FIG. 7 such that the greatest insulation between the winding layers may be disposed at the extremities of such layers from their common connection. The insulation required and disposed between the respective adjacent layers at their common connection is shown to be vary small decreasing to zero at the common connection. In this way the main and auxiliary secondary winding layers can be compressed such that they require much less radial distance from the magnetic core than if they were disposed in conventional cylindrical fashion. This results in another reduction in magnetic core losses since the magnetic core can encircle the conical windings with a smaller circumference and therefore less magnetic core material is required to complete the magnetic circuit thereby decreasing hysteresis losses during operation of the transformer. There is also a corresponding reduction in overall size of the transformer itself due to the compressed accordion arrangement of the secondary winding layers. Secondary auxiliary winding layers 122', 124', 126' and 128' are also constructed in a conical shape and are disposed in the same manner as the main secondary winding layers so as to maximize use of available insulation space. Spacing of the auxiliary secondary layers however is also subject to the additional criteria of necessary space between the auxiliary secondary and auxiliary primary winding so that transformer winding arrangement 100 will exhibit the desired input impedance under fault and overload conditions as explained above. Accordingly, FIG. 7 is not drawn to scale but is only an illustration of the concepts and winding compactness of the invention.

When a fault or overload occurs during operation of a superconducting transformer with a winding arrangement according to the teachings of the invention and current is shunted or switched into the auxiliary windings a large amount of heat energy is generated in the main windings because now the main winding superconducting wire has gone normal and is subject to the normal $RI=V$ resistance (see FIG. 3) of conventional conductors. The current in the auxiliary windings of course remains below the critical current wherein the superconducting wire becomes normal due to their higher impedance and larger capacity. Large amounts of energy dissipated in the main windings as heat loss puts an exorbitant load [work done on the cryogenic fluid to remove the heat generated in the windings is on the order of 500 times the actual amount of energy to be removed from the system] on the refrigerator which must cool the cryogenic fluid to remove this dissipated heat such that the superconducting wire of the main windings will return to a temperature range wherein the wire will again be superconducting.

Experimental development work on the superconducting transformer of the invention has revealed that removal of the main primary and secondary windings from the line during periods of excessive current demand enables a reduction in refrigerator capacity without impairing the ability to return the windings below the critical temperature. Removal of the main windings from the line at the critical period when the auxiliary windings begin to conduct current may be facilitated by switching means placed in the main windings controlled by a current sensing means placed in the auxiliary windings in conjunction with current level detecting means. The switching means for the main windings may be two cryogenic contactors or circuit breakers that might be developed in the future, placed in the main primary and the main secondary circuits. Using state of the art circuit elements presently available, the switching means can be accomplished with fast acting circuit breakers connected to the main primary and secondary windings by means of conventional bushings passing through the cryogenic insulating wall.

Figure 8:
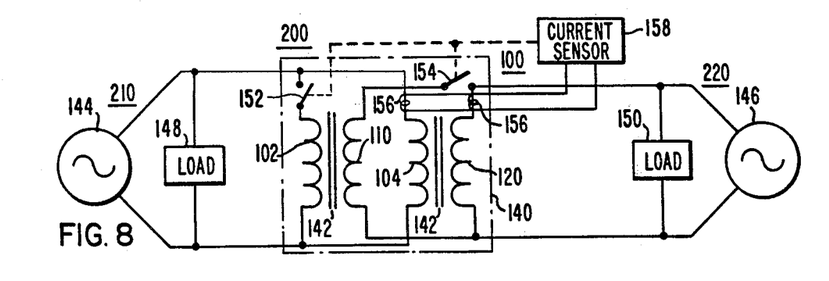
FIG. 8 is a schematic diagram of a superconducting transformer which may be constructed according to the teachings of the invention.

Accordingly FIG. 8 is a schematic diagram of superconducting transformer 200 which may be constructed according to the teachings of the invention. Transformer 200 includes a primary portion which includes main primary winding 102 and auxiliary primary winding 104, and a secondary portion which includes main secondary winding 110 and auxiliary secondary winding 120. The broken outline 140 about the windings represents a tank or housing filled with a cryogenic medium, such as liquid or supercritical helium. The primary and secondary portions, which may be disposed in inductive relation with the magnetic core 142, are shown respectively connected to power systems 210 and 220, each including a source of alternating potential, 144 and 146, respectively, and a load circuit 148 and 150, respectively. The main primary and main secondary windings are connected in parallel with the auxiliary primary and secondary windings via switches, contactors or circuit breakers 152 and 154 respectively. Current sensing means such as two current transformers shown generally at 156 and level detecting means shown generally at 158, are disposed to sense the current flowing in the auxiliary windings. Current in both main or both auxiliary windings must be sensed because a DC or a high frequency transient may cause one main winding (whether primary or secondary) to go normal without affecting the other. The level detecting means 158, for example, may include a rectifier and an OP AMP level detector. The level detecting means 158 is set to provide a signal for closing switches 152 and 154 when the current sensing means 156 senses a predetermined magnitude of current in the auxiliary windings, at which time the transformer must be subjected to fault or overload conditions and the current is switching out of the main windings and into the auxiliary windings.

The development of the preferred embodiment of the invention revealed that the shunting of current from the main into the auxiliary windings did not occur when the superconducting multifilamentary wire was embedded in a matrix of pure copper or a substantially pure copper alloy because the copper matrix presented a higher admittance than the auxiliary windings. The resistive component of the main winding matrix impedance must be higher than the reactive impedance of the corresponding auxiliary winding to promote shunting of current into the auxiliary windings. Accordingly, a unique resistive matrix of an arrangement of copper and copper-nickel alloys was developed to promote rapid shunting of the current from the main to the auxiliary windings when an overload or fault occurred. Windings formed of multifilamentary superconducting wire embedded in this copper-nickel matrix have successfully demonstrated the requisite rapid switching of fault currents into the auxiliary windings. The invention of course is not limited to a copper and copper alloy matrix; an arrangement of aluminum and aluminum alloys or other conductive materials may be used.

Referring again to FIG. 8, power systems 210 and 220 could represent two transmission grids of neighboring utilities which operate at the same or differing voltages. Superconducting transformer 200 would thereby provide a conduit for the transfer of power between neighboring utility systems. Since superconducting transformer 200 includes current limiting winding arrangement 100 according to the teachings of the invention, power can be normally transferred back and forth between the two grids or power systems without obstruction as the two power systems 210 and 220 are coupled under normal operating conditions by low impedance main primary and secondary windings 102 and 110, respectively. However, a fault on power system 210 is isolated from power system 220 and vice versa because of the current limiting function of superconducting transformer 200 due to the higher impedance of auxiliary primary and secondary windings 104 and 120, respectively. Presently this function is performed with state of the art equipment by means of circuit breakers or two transformers (one low impedance and the other high) and necessary switching means such as high speed contactors.

In conclusion, the superconducting transformer of the invention is premised upon the location of the auxiliary windings in the minimum field regions that are known to exist in a transformer, with a resulting reduction of AC losses. Further the invention discloses a unique winding arrangement that minimizes radial spacing and insulation requirements as well as provides a small leakage reactance under steady state conditions while having a large leakage reactance under fault conditions. This winding arrangement permits a more compact transformer that provides current limitation during an electrical fault or overload and efficient operation under normal operating conditions. Also disclosed is three innovations in the structural embodiment of the superconducting transformer of the invention:

(1) Means for open circuiting the main windings when the current exceeds a predetermined magnitude so that a reduced refrigerator can restore operating temperatures.

(2) A unique resistive matrix to envelop the multifilamentary superconducting wire to promote rapid switching of the current from the main to the auxiliary windings under fault or overload conditions.

(3) Novel conical shaped winding layers which provide for closer spacing of the windings due to more efficient use of insulation space.

I claim:

1. A superconducting transformer comprising:
    a main primary winding having a plurality of turns formed of superconducting wire and adapted for connection to an external alternating energizing source;
    a main secondary winding including at least two serially connected concentrically adjacent layers each having a plurality of turns formed of superconducting wire, said main secondary winding being adapted for connection to an external load;
    said main secondary winding being disposed adjacent to and concentric with the periphery of said main primary winding, such that when said main primary and main secondary windings are energized two minimum field regions are created, one within the innermost winding and one external to the outermost winding;
    an auxiliary primary winding having a plurality of turns formed of superconducting wire disposed adjacent to and concentric with the periphery of said main primary winding, within one of said minimum field regions;
    and an auxiliary secondary winding including at least two serially connected, concentrically adjacent layers each having a plurality of turns formed of superconducting wires, said auxiliary secondary winding being disposed adjacent to and concentric with the periphery of said main secondary winding, within the remaining of said minimum field regions;
    said main primary and main secondary windings being sized to carry normal operating currents of said transformer;
    said auxiliary primary and secondary windings being sized to carry predetermined fault and overload currents of said transformer;
    said auxiliary primary winding being connected in parallel with said main primary winding, and said auxiliary secondary winding being connected in parallel with said main secondary winding;
    said auxiliary primary and secondary windings having a predetermined radial spacing relative to the main primary and secondary windings respectively, selected to provide different impedance paths, such that negligible current flows in the auxiliary primary and secondary windings until predetermined currents are exceeded in the main primary and secondary windings, at which time the impedance of the main primary and secondary windings increases to cause the auxiliary primary and secondary windings to carry the excess current;
    said main secondary winding layers having a predetermined radial spacing relative to said main primary winding selected to cause said superconducting transformer to have a lower input impedance when current flows in said main primary and secondary windings, and said auxiliary secondary winding layers having a predetermined radial spacing relative to said auxiliary primary winding selected to cause the input impedance of said superconducting transformer to increase when current flow increases in said auxiliary primary and secondary windings.

2. The superconducting transformer of claim 1 wherein the superconducting wire forming the main windings includes a plurality of filaments embedded in a matrix of a first conductive material and the superconducting wire forming the auxiliary windings includes a plurality of filaments embedded in a matrix of a second conductive material, said first conductive material having a higher electrical resistance than said second conductive material to provide an electrically conductive path through the matrix in each of the main windings which has a higher electrical impedance than the impedance of any electrically conductive path through each corresponding auxiliary winding to promote the shunting of electrical currents above a predetermined magnitude from the main windings into the auxiliary windings.

3. The superconducting transformer of claim 2 wherein the matrix of a first conductive material includes an arrangement of copper and copper alloys and the matrix of a second conductive material includes an arrangement of copper.

4. The superconducting transformer of claim 2 wherein the matrix of a first conductive material includes an arrangement of aluminum and aluminum alloys and the matrix of a second conductive material includes an arrangement of aluminum.

5. The superconducting transformer of claim 1 wherein certain adjacent layers of the main and auxiliary secondary windings have a conical shape such that as the voltage difference between two radially adjacent turns increases, the radial distance separating said turns increases.

6. The superconducting transformer of claim 1 including means for sensing the magnitude of the current flowing in at least one of the main and auxiliary windings, and means responsive to said current sensing means for open-circuiting the main primary and secondary windings when the sensed current exceeds a predetermined level, and for close-circuiting the main primary and secondary windings when the sensed current is below the predetermined level.

7. The superconducting transformer of claim 6 wherein the sensing means senses the magnitude of the current flow in the auxiliary secondary winding.

8. A superconducting transformer comprising:
a main primary winding having a plurality of turns formed of superconducting wire and adapted for connection to an external alternating energizing source;
a main secondary winding including at least two serially connected concentrically adjacent layers each having a plurality of turns formed of superconducting wire, said main secondary winding being adapted for connection to an external load;
said main secondary winding being disposed adjacent to and concentric with the periphery of said main primary winding, such that when said main primary and main secondary windings are energized two minimum field regions are created, one within the innermost winding and one external to the outermost winding;
an auxiliary primary winding having a plurality of turns formed of superconducting wire disposed adjacent to and concentric with the periphery of said main primary winding, within one of said minimum field regions; and
an auxiliary secondary winding including at least two serially connected, concentrically adjacent layers each having a plurality of turns formed of superconducting wire, said auxiliary secondary winding being disposed adjacent to and concentric with the periphery of said main secondary winding, within the remaining of said minimum field regions;
said auxiliary primary winding being connected in parallel with said main primary winding, and said auxiliary secondary winding being connected in parallel with said main secondary winding;
said main secondary winding layers having a predetermined radial spacing relative to said main primary winding selected to cause said main windings to have a lower input impedance and said auxiliary secondary winding layers having a predetermined radial spacing relative to said auxiliary primary winding layers selected to cause said auxiliary windings to have a higher input impedance, such that the input impedance of said superconducting transformer increases as current switches out of said main winding layers into said auxiliary winding layers.

9. Electrical induction apparatus, comprising:
at least one pair of superconducting windings, including a main winding having a plurality of turns of superconducting wire, and an auxiliary winding having a plurality of turns of superconducting wire;
said auxiliary winding being connected in parallel with said main winding;
said superconducting wire forming said main windings including a plurality of filaments of superconducting material embedded in a matrix of a first conductive material and said superconducting wire forming said auxiliary windings including a plurality of filaments of superconducting material embedded in a matrix of a second conductive material, said first conductive material having a higher electrical resistance than said second conductive material to provide an electrically conductive path through said matrix of said main windings which has a higher electrical impedance than the impedance of any electrically conductive path through said auxiliary winding to promote the shunting of electrical currents of a predetermined magnitude from said main windings into said auxiliary windings.

10. Electrical inductive apparatus, comprising:
a superconducting winding including at least two serially connected concentrically adjacent layers each having a plurality of turns formed of superconducting wire;
said adjacent layers of said superconducting winding having a conical shape such that as the voltage difference between two radially adjacent turns increases, the radial distance separating said turns increases.

11. Electrical apparatus, comprising:
first and second electrical transmissions grids each including first and second sources of alternating potential and first and second load circuits, respectively;
the superconducting transformer according to claim 8 wherein the primary windings are connected to said first electrical transmission grid and the secondary windings are connected to said second electrical transmission grid.

* * * * *